(12) United States Patent
Hanumantharau et al.

(10) Patent No.: US 10,353,723 B2
(45) Date of Patent: Jul. 16, 2019

(54) PL/SQL LANGUAGE PARSING AT A VIRTUAL MACHINE

(71) Applicant: salesforce.com, inc., San Francisco, CA (US)

(72) Inventors: Raghavendran Hanumantharau, Fremont, CA (US); Yoram Tal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/883,803

(22) Filed: Jan. 30, 2018

(65) Prior Publication Data

US 2019/0042288 A1 Feb. 7, 2019

Related U.S. Application Data

(60) Provisional application No. 62/540,729, filed on Aug. 3, 2017.

(51) Int. Cl.
*G06F 9/455* (2018.01)
*G06F 16/242* (2019.01)

(52) U.S. Cl.
CPC ........ *G06F 9/4552* (2013.01); *G06F 9/45558* (2013.01); *G06F 16/2448* (2019.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,987,463 A | * | 11/1999 | Draaijer | G06F 16/24553 |
| 6,108,659 A | * | 8/2000 | Vincent | G06F 8/30 |
| | | | | 717/116 |
| 6,219,666 B1 | * | 4/2001 | Krishnaswamy | G06F 8/443 |
| | | | | 707/607 |

(Continued)

OTHER PUBLICATIONS

Oracle Database PL/SQL Language Reference Oracle Inc. 2014 <available at https://docs.oracle.com/cd/E11882_01/appdev.112/e25519.pdf> (Year: 2014).*

(Continued)

*Primary Examiner* — Matthew J Brophy
(74) *Attorney, Agent, or Firm* — Holland & Hart LLP (57) ABSTRACT

In some database systems, a user device may query for data records using a procedural language extension to structured query language (PL/SQL) call. However, some databases may not be configured to process PL/SQL code. In these cases, a virtual machine may intercept the PL/SQL call, and may transform the call to a format usable by the database. For example, the virtual machine may deconstruct the PL/SQL call to determine the procedural and query functions that comprise the PL/SQL call. The virtual machine may then search a database for non-PL/SQL code snippets that correspond to these determined functions, and may generate non-PL/SQL code (e.g., Java code) that may perform the same functions as the PL/SQL call. The virtual machine, the database, or a combination of the two may execute the non-PL/SQL code to retrieve the data records from the database, and may return the records to the user device.

20 Claims, 9 Drawing Sheets

(56) References Cited

U.S. PATENT DOCUMENTS

| | | | | |
|---|---|---|---|---|
| 6,978,305 B1* | 12/2005 | Nainani | | H04L 67/02 |
| | | | | 709/206 |
| 7,047,249 B1* | 5/2006 | Vincent | | G06F 8/30 |
| 7,103,590 B1* | 9/2006 | Murthy | | G06F 16/24553 |
| 7,117,429 B2* | 10/2006 | Vedullapalli | | G06F 17/211 |
| | | | | 715/235 |
| 7,131,116 B1* | 10/2006 | Krishna | | H04L 51/066 |
| | | | | 717/136 |
| 7,206,842 B2* | 4/2007 | Nainani | | H04L 67/02 |
| | | | | 709/206 |
| 7,346,897 B2* | 3/2008 | Vargas | | G06F 8/51 |
| | | | | 717/136 |
| 7,516,121 B2* | 4/2009 | Liu | | G06F 16/2448 |
| 7,725,501 B1* | 5/2010 | Stillman | | G06F 16/289 |
| | | | | 707/805 |
| 7,860,894 B2* | 12/2010 | Rohwedder | | G06F 8/437 |
| | | | | 707/802 |
| 7,870,012 B2* | 1/2011 | Katz | | G06Q 10/06316 |
| | | | | 705/7.26 |
| 8,072,467 B2* | 12/2011 | Bruckner | | G06F 16/2455 |
| | | | | 345/619 |
| 8,321,838 B2* | 11/2012 | Alpern | | G06F 11/362 |
| | | | | 714/11 |
| 8,438,186 B2* | 5/2013 | Lee | | G06F 16/29 |
| | | | | 707/792 |
| 8,799,863 B2* | 8/2014 | Alpern | | G06F 11/362 |
| | | | | 714/11 |
| 9,965,259 B2* | 5/2018 | Vargas | | G06F 8/51 |
| 2002/0138316 A1* | 9/2002 | Katz | | G06Q 10/06311 |
| | | | | 705/7.13 |
| 2002/0178077 A1* | 11/2002 | Katz | | G06Q 10/0637 |
| | | | | 705/7.36 |
| 2003/0033179 A1* | 2/2003 | Katz | | G06Q 10/063 |
| | | | | 705/7.12 |
| 2005/0097108 A1* | 5/2005 | Wang | | G06F 16/284 |
| 2006/0005138 A1* | 1/2006 | Rohwedder | | G06F 8/437 |
| | | | | 715/748 |
| 2006/0015565 A1* | 1/2006 | Nainani | | H04L 67/02 |
| | | | | 709/206 |
| 2007/0130133 A1* | 6/2007 | Lee | | G06F 16/2443 |
| 2008/0141222 A1* | 6/2008 | Alpern | | G06F 11/362 |
| | | | | 717/125 |
| 2008/0178043 A1* | 7/2008 | Xu | | G06F 11/3688 |
| | | | | 714/32 |
| 2008/0183726 A1* | 7/2008 | Bruckner | | G06F 16/2455 |
| 2012/0192154 A1* | 7/2012 | Alpern | | G06F 11/362 |
| | | | | 717/124 |
| 2012/0297237 A1* | 11/2012 | Chatterjee | | G06F 16/252 |
| | | | | 714/4.1 |
| 2013/0066952 A1* | 3/2013 | Colrain | | G06F 11/1438 |
| | | | | 709/203 |
| 2014/0181798 A1* | 6/2014 | Narayanan | | G06F 8/427 |
| | | | | 717/143 |

OTHER PUBLICATIONS

Kotecha, Shyam, Minal Bhise, and Sanjay Chaudhary. "Query translation for cloud databases." 2011 Nirma University International Conference on Engineering. IEEE, 2011. (Year: 2011).*

* cited by examiner

PL/SQL LANGUAGE PARSING AT A VIRTUAL MACHINE

CROSS REFERENCES

The present Application for Patent claims priority to U.S. Provisional Patent Application No. 62/540,729 by Hanumantharau et al., entitled "PL/SQL Language Parsing at a Virtual Machine," filed Aug. 3, 2017, which is assigned to the assignee hereof and expressly incorporated by reference herein.

FIELD OF TECHNOLOGY

The present disclosure relates generally to database systems and data processing, and more specifically to procedural language extension to structured query language (PL/SQL) language parsing at a virtual machine.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Many user devices or applications may implement procedural language extension to structured query language (PL/SQL) for retrieving data records from databases. Some databases may execute PL/SQL code internally, and may successfully return the requested data records. However, other databases may not be configured to handle PL/SQL code, and therefore may fail to execute the code and return the requested data records.

DETAILED DESCRIPTION

In some database systems, a user device may implement procedural language extension to structured query language (PL/SQL) calls for one or more applications. The PL/SQL calls may include procedural functionality (e.g., conditional statements, loops, etc.) and querying functionality (e.g., using structured query language (SQL) syntax). Some databases (e.g., Oracle databases) may be configured to receive PL/SQL calls over external database connectors, and may execute the PL/SQL calls internally. These databases may execute both the procedural functions and the query functions, and may retrieve data records stored in the databases based on the SQL queries included in the PL/SQL call. However, not all databases may support receiving and executing PL/SQL calls.

For a user device implementing PL/SQL to retrieve data from a database that does not support PL/SQL, the database system may utilize a PL/SQL virtual machine, which may be hosted on a virtual machine server. The PL/SQL virtual machine—or an associated client library or client stub—may intercept the PL/SQL call sent from the user device. The PL/SQL virtual machine may interpret the PL/SQL call to determine a set of functions corresponding to the call. In some cases, the virtual machine may translate this set of functions into a different language other than PL/SQL (e.g., Java) that the database may support. In these cases, the virtual machine may send the translated code to the database via an external database connector, and the database may execute the code and retrieve the corresponding records. In other cases, the virtual machine may perform procedural functionality associated with the PL/SQL call, and may send one or more queries (e.g., SQL queries) to the database throughout or following the execution of the procedural functionality at the virtual machine. In such cases, the database may retrieve the corresponding records based on the received queries, and may send the records back to the virtual machine or to the user device. By implementing the virtual machine, a database system may support user devices querying data from PL/SQL compatible and non-PL/SQL compatible databases using PL/SQL calls.

Aspects of the disclosure are initially described in the context of an environment supporting an on-demand database service. Additional aspects are described with respect to a PL/SQL interception architecture, a PL/SQL interpretation process, and a process flow. Aspects of the disclosure are further illustrated by and described with reference to apparatus diagrams, system diagrams, and flowcharts that relate to PL/SQL language parsing at a virtual machine.

Figure 1:
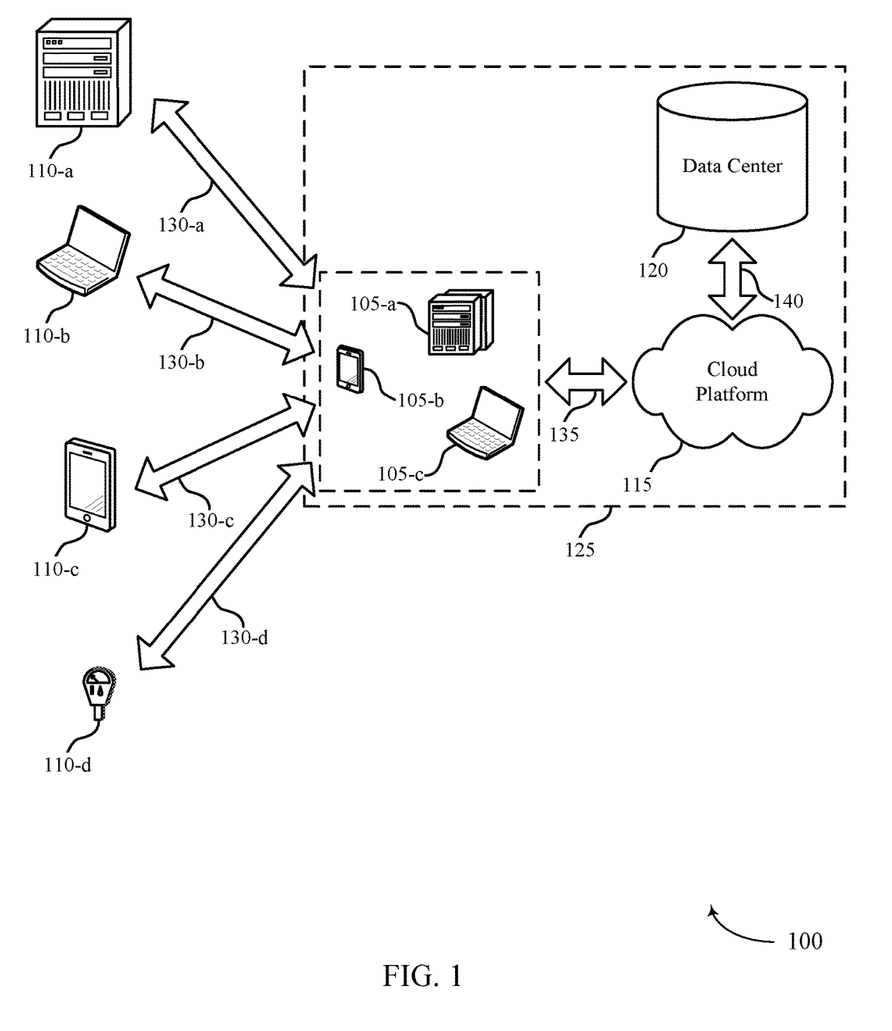
FIG. 1 illustrates an example of a system for programming language parsing that supports procedural language extension to structured query language (PL/SQL) language parsing at a virtual machine in accordance with aspects of the present disclosure.

FIG. 1 illustrates an example of a system 100 for cloud computing that supports PL/SQL language parsing at a virtual machine in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud client 105 may query for data stored in data center 120. For example, the cloud client 105 may implement a PL/SQL call, which may contain procedural code including SQL querying operating as a single programming language. PL/SQL may include handling for a set of data types, which may be an example of a superset of the data types stored in the data center 120. Implementing PL/SQL may allow the cloud client 105 to avoid mapping data types, preparing statements, or processing result sets. In some cases, the data center 120 may be configured to process PL/SQL calls within a database, and may return one or more data records to the cloud client 105 in response.

However, in other cases, the data center 120 may not be configured to implement PL/SQL. In these cases, a virtual machine, such as a virtual machine hosted on a server associated with the cloud platform 115 or data center 120, may intercept the PL/SQL call. Using language parsing techniques, the virtual machine may identify a set of functions corresponding to the PL/SQL call (e.g., an aggregation of the entire set of functions may match the functionality of the PL/SQL call). The virtual machine may generate non-PL/SQL code (e.g., using Java, JavaScript, Apex, C, C++, Python, or any other high-level programming language) configured to perform the identified set of functions. In some cases, the virtual machine may generate the code using a PL/SQL specification, stored data relating code snippets of the high-level programming language to different PL/SQL functions, or a combination thereof. The virtual machine and the data center 120 may then execute the generated code (e.g., over a database connector) to retrieve the one or more data records from the data center 120. The data center 120 not configured to implement PL/SQL may return the data records to the cloud client 105 in response to the PL/SQL call based on the interception, parsing, and code generation performed by the virtual machine.

Figure 2:
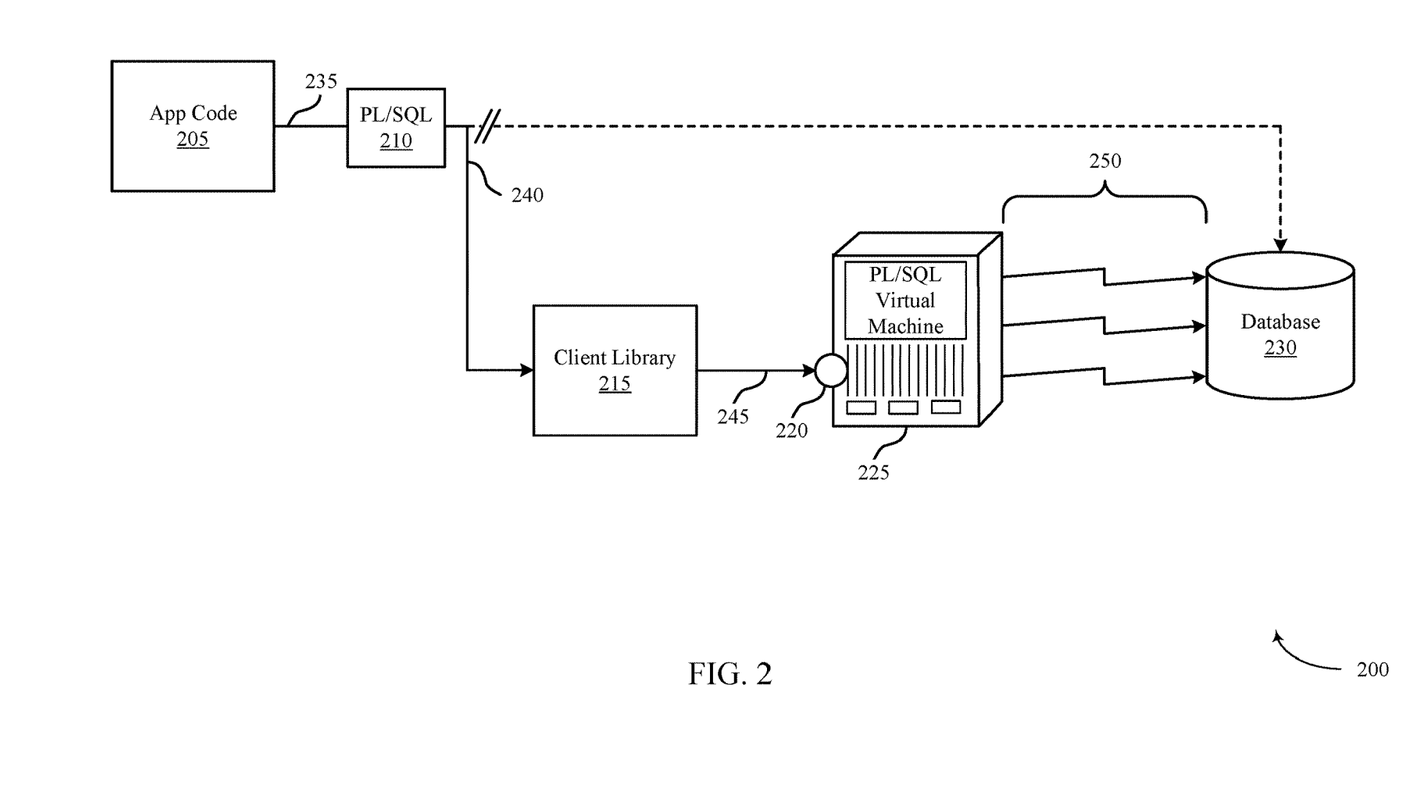
FIG. 2 illustrates an example of an architecture for PL/SQL interception that supports PL/SQL language parsing at a virtual machine in accordance with aspects of the present disclosure.

FIG. 2 illustrates an example of an architecture for PL/SQL interception 200 that supports PL/SQL language parsing at a virtual machine in accordance with various aspects of the present disclosure. The architecture for PL/SQL interception 200 may include a PL/SQL virtual machine server 225 and a database 230, which may be an example or a component of data center 120 as described with reference to FIG. 1. In some cases, the database 230 may not include capabilities to process PL/SQL code. However, one or more applications may implement PL/SQL calls to query data layer information, such as records, from the database 230. In these cases, the PL/SQL virtual machine server 225 may intercept the PL/SQL calls, interpret and convert the PL/SQL calls into another programming language (e.g., a higher language programming language, such as Java), and communicate with the database 230 using the other programming language rather than PL/SQL.

A user device, such as a cloud client 105 as described with reference to FIG. 1, may run an application or perform a process that queries data from database 230. For example, the user device may process application code 205, which may include transmitting a PL/SQL call 210 at 235 to database 230. The PL/SQL call 210 may include PL/SQL code, containing procedure language, SQL queries, or some combination of the two. The PL/SQL call 210 may be intercepted at 240, and may not be received by the database 230. For example, a client library 215 may intercept the PL/SQL call 210. In some cases, the client library 215 may identify that the database 230 is not configured to handle PL/SQL calls, and may intercept the PL/SQL call 210 based on this identification. In other cases, the client library 215 may intercept every PL/SQL call 215 made by the application code 205. The interception process at 240 may be based on a special annotation within the application code 205, or may be based on an extension to a database connector 250, such as a Java database connectivity (JDBC) connection, which may connect externally to the database 230.

The client library 215, which in some cases may be an example of a client stub, may serialize the PL/SQL call 210 metadata into a format to transmit to the PL/SQL virtual machine server 225. The client library 215 may utilize a serialization protocol, such as ProtoBuf, to serialize the PL/SQL call 210. For example, the client library 215 may translate the PL/SQL call 210 into a formatted packet, which may be referred to as an invocation packet, based on a package signature, a function signature, an argument signature, or some combination of these signatures corresponding to the PL/SQL call 210. The invocation packet may include enough data (e.g., based on these signatures) for a server to reconstruct the PL/SQL call 210 based on the invocation packet. The client library 210 may transmit, at 245, the invocation packet to a PL/SQL listener 220, which may be a component of the PL/SQL virtual machine server 225 (e.g., a single server or a server cluster). In some cases, rather than serializing the PL/SQL call 210 at the client library 215, the intercepted PL/SQL call 210 may be sent directly to the PL/SQL listener 220.

The PL/SQL listener 220 may receive the invocation packet, and may perform a de-serialization process to reconstruct the PL/SQL call 210. In other cases, the PL/SQL listener 210 may receive the PL/SQL call 210. During the de-serialization process, or once the PL/SQL listener 220 has the PL/SQL call 210, the PL/SQL listener 220 may determine one or more functions associated with the PL/SQL call 210 (e.g., using a parsing construct or framework, such as another tool for language recognition (ANTLR)). For example, the PL/SQL call 210 may include procedural functions (e.g., both functions and procedures) and query functions (e.g., SQL queries). Either the PL/SQL listener 220 or the PL/SQL virtual machine server 225 may determine the set of functions corresponding to the PL/SQL call 210. In a specific example, ANTLR may translate a CREATE OR REPLACE PACKAGE BODY function in a PL/SQL call 210 into the following grammar:

```
create_package_body
    : CREATE (OR REPLACE)? PACKAGE BODY package_name (IS
    | AS)
package_obj_body* (BEGIN seq_of_statements | END
package_name?) ';'
    ;
```

The PL/SQL listener 220 or the PL/SQL virtual machine server 225 may search for non-PL/SQL code corresponding to the set of functions. For example, the PL/SQL virtual machine server 225 may host an indication (e.g., in a database, data file, table, schema, etc.) of code snippets implementing a higher-level programming language, such as Java. Each code snippet may be associated with a specific PL/SQL function (e.g., based on a PL/SQL specification). In one example, a PL/SQL procedural function implementing a conditional statement may correspond to a Java code snippet containing the corresponding Java conditional statement. The PL/SQL listener 220 or the PL/SQL virtual machine server 225 may perform a check to identify any functions of the PL/SQL call 210 that do not correspond to any code snippet stored in the PL/SQL virtual machine server 225, and in some cases may send an error message or an indication of the identified functions to the user device. In such cases, the PL/SQL virtual machine server 225 may not retrieve any data records from the database 230.

An interpreter hosted at the PL/SQL virtual machine server 225, such as a just-in-time (JIT) interpreter, may generate an executable code based on the set of functions corresponding to the PL/SQL call 210. For example, the interpreter may aggregate the code snippets corresponding to the functions into a non-PL/SQL code. The aggregation process may include code generation logic to handle some functionality (e.g., nested procedural or query functions). Additionally or alternatively, the code generation may include evaluating function or module dependencies using compiler techniques, such as a parser generator, a dependency graph, annotated parse trees, etc. The PL/SQL virtual machine server 225 may store the generated code in a code cache, so that the PL/SQL virtual machine server 225 may efficiently retrieve the code if it receives a similar PL/SQL call 210 at a later time. In some cases, the PL/SQL virtual machine server 225 may perform a set of tests on the non-PL/SQL code to determine whether the non-PL/SQL code matches or is similar to the functionality of the PL/SQL call 210. The interpreter or a processor at the PL/SQL virtual machine server 225 may execute the generated non-PL/SQL code (e.g., over one or more dedicated database connectors 250 to the database 230). In some cases, the PL/SQL virtual machine server 225 may execute the generated non-PL/SQL code, and may transmit queries to the database 230 over the database connectors 250. In other cases, the PL/SQL virtual machine server 225 may transmit the generated code to the database 230 over the database connectors 250, and the database 230 may process and execute the non-PL/SQL code. In yet other cases, the PL/SQL virtual machine server 225 and the database 230 may both execute portions of the non-PL/SQL code using the database connectors 250.

In any of the above cases, the database 230 may receive a query message, and may retrieve one or more data records stored at the database 230 based on the query message. The database 230 may transmit the data records back to the user device based on the query message. In some cases, the database 230 may first send the data records to the PL/SQL virtual machine server 225 or the client library 215, which may serialize the data records. The serialized data records may then be sent to the user device, which may perform a de-serialization process to obtain the queried data records. In this way, the database 230 may return data records to the user device based on a PL/SQL call 210, even if the database 230 cannot process PL/SQL code. Such an architecture for PL/SQL interception 200 may allow a user device to encode database queries using PL/SQL, whether or not the database is configured to handle PL/SQL. In such cases, the user device may operate without being aware of the type or functionality of the database that the user device is interacting with. The interpreter may result in the user device receiving the same data records in response to the PL/SQL call 210 for a database 230 configured to process PL/SQL code and a database 230 not configured to process PL/SQL code.

Figure 3:
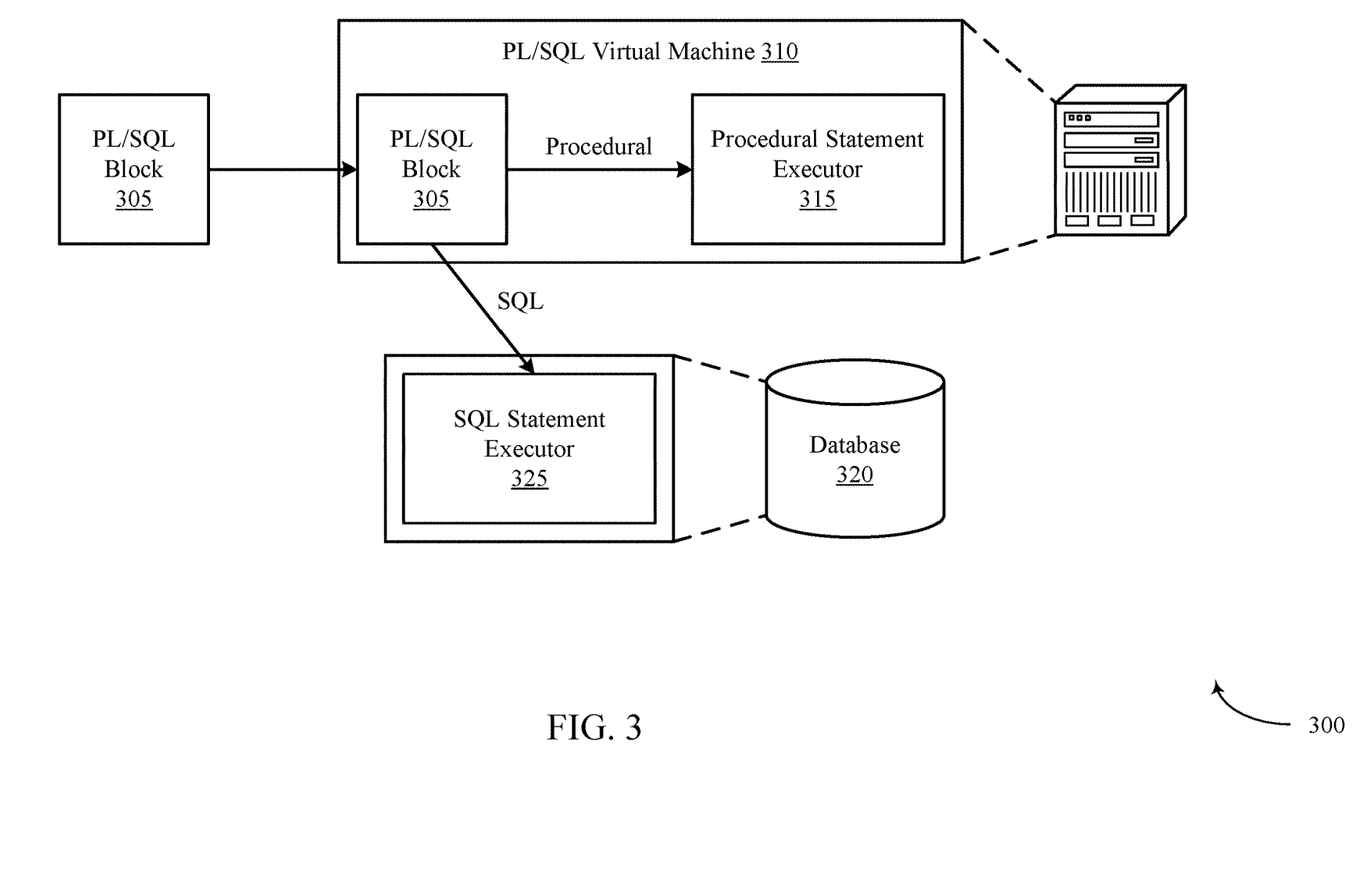
FIG. 3 illustrates an example of a PL/SQL interpretation process that supports PL/SQL language parsing at a virtual machine in accordance with aspects of the present disclosure.

FIG. 3 illustrates an example of a PL/SQL interpretation process 300 that supports PL/SQL language parsing at a virtual machine in accordance with various aspects of the present disclosure. A PL/SQL virtual machine 310, which may be an example of a PL/SQL virtual machine server 225 as discussed with reference to FIG. 2, may intercept a PL/SQL code block 305. The PL/SQL virtual machine 310 may parse and interpret the PL/SQL code block 305 to be processed by a procedural statement executor 315 and a SQL statement executor 325, which may run in a database 320. Based on the PL/SQL interpretation process 300, a database 320 (e.g., a database 230 described with reference to FIG. 2) that is configured to process SQL statements but not PL/SQL statements may perform query processing based on the PL/SQL code block 305.

In the PL/SQL interpretation process 300, an application may query for data records stored in the database 320. Rather than sending the query (e.g., a PL/SQL code block 305) to the database 320, the application may route the query to the PL/SQL virtual machine 310, which may be referred to as a PL/SQL engine or a query handling engine. The PL/SQL virtual machine 310 may deconstruct the PL/SQL code block 305 on the fly. For example, the PL/SQL virtual machine 310 may receive the PL/SQL code block 305 and automatically identify procedural operations and SQL operations specified in the PL/SQL code block 305. In some cases, the PL/SQL virtual machine 310 may translate these operations into a higher-level programming language for execution by a processor in the PL/SQL virtual machine 310 or database 320, while in other cases, the PL/SQL virtual machine 310 may execute the interpreted PL/SQL procedure via a database connection. The PL/SQL virtual machine 310 may send the identified procedural operations to a procedural statement executor 315, and may send the SQL operations to a SQL statement executor 325. In some cases, the PL/SQL virtual machine 310 may execute the procedural operations at the procedural statement executor 315. The PL/SQL virtual machine 310 may send the SQL operations to the database 320 during or after execution of the procedural operations. For example, the PL/SQL virtual machine 310 may send a SQL operation to the database 320 based on executing a conditional statement as part of the procedural operations at the procedural statement executor 315.

The database 320 may receive the SQL operations (e.g., over one or more JDBC connections), and may execute the SQL operations at the SQL statement executor 325. In some cases, the procedural statement executor may also be hosted in the database 330, along with the SQL statement executor 325. The database 320 may retrieve data records corresponding to the executed SQL code, and my transmit the data records back to the application that sent the PL/SQL code block 305. In some cases, the application may implement PL/SQL code to interact with a user interface. For example, the PL/SQL code may display the retrieved data records to a user, or may read input from the user. In these cases, the application may utilize PL/SQL for input functions, output functions, and database communication functions.

The PL/SQL virtual machine 310 may operate transparently in the system. For example, the application sending the PL/SQL code block 305 may not receive any indication of whether the PL/SQL code block 305 is processed at a database 320 or at a PL/SQL virtual machine 310. Accordingly, the application may interact with a database 320 such as an Oracle database, a SQL server database, or any other database using the same PL/SQL code block 305, based on the interception and processing performed by the PL/SQL virtual machine 310.

Figure 4:
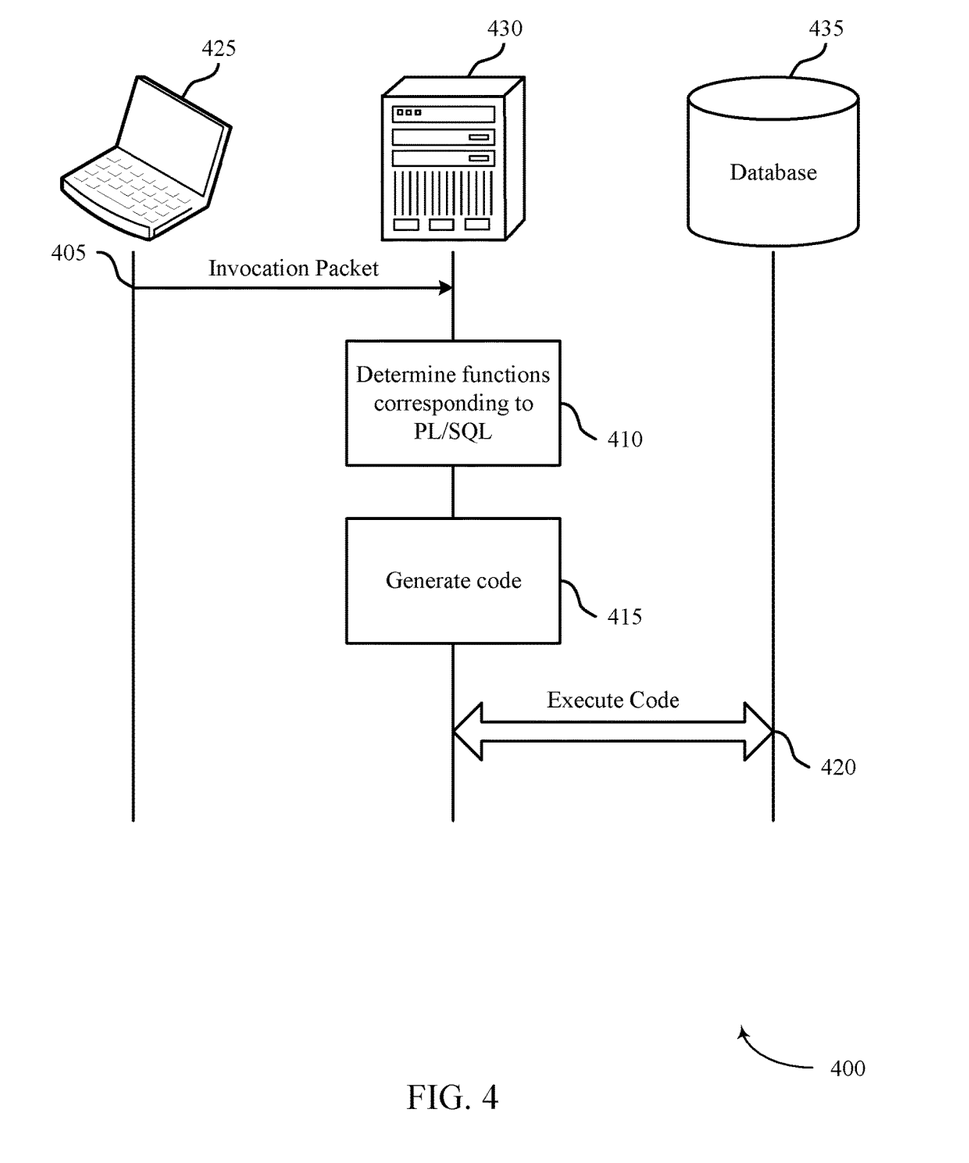
FIG. 4 illustrates an example of a process flow that supports PL/SQL language parsing at a virtual machine in accordance with aspects of the present disclosure.

FIG. 4 illustrates an example of a process flow 400 that supports PL/SQL language parsing at a virtual machine in accordance with various aspects of the present disclosure. The process flow 400 may include a user device 425, a virtual machine 430, and a database 435. The user device 425 may be an example of a cloud client 105 as discussed with respect to FIG. 1, the virtual machine 430 may be an example of a PL/SQL virtual machine server 225 or PL/SQL virtual machine 310 as discussed with respect to FIGS. 2 and 3, and the database 435 may be an example of a data center 120 or a database 230 or 320 as discussed with respect to FIGS. 1 through 3. The process flow 400 may illustrate a process for querying data from a database 435 based on a PL/SQL call when the database 435 is not configured to process PL/SQL code.

At 405, the virtual machine 430 may receive an invocation packet containing an indication of a PL/SQL call. In some cases, the invocation packet may include the actual PL/SQL call. In other cases, the user device 425 may send a PL/SQL call to the database 435, and a client library or client stub may intercept the PL/SQL call and transform the PL/SQL call to generate the invocation packet. For example, the client stub may serialize the metadata associated with the PL/SQL call to generate the invocation packet.

At 410, the virtual machine 430 may determine one or more functions (e.g., procedural functions, query functions, or some combination thereof) corresponding to the PL/SQL call based on the received invocation packet. In some cases, the virtual machine 430 may determine the one or more functions based on de-serializing the invocation packet. Additionally or alternatively, the virtual machine 430 may determine the one or more functions based on a JIT compiler, a JIT interpreter, a parser generator, a dependency graph, an annotated parse tree, or any other structure or process for determining the functions contained in a PL/SQL call.

At 415, the virtual machine 430 may generate non-PL/SQL code configured to perform the determined one or more functions. In some cases, the virtual machine 430 may generate the non-PL/SQL code based on identifying that the database 435 is not PL/SQL compatible. In some examples, the virtual machine 430 may identify a non-PL/SQL code snippet corresponding to each of the one or more functions (e.g., using a stored data table or schema). In these examples, the virtual machine 430 may aggregate the code snippets in order to generate the non-PL/SQL code.

At 420, the virtual machine 430 may execute the generated non-PL/SQL code. The virtual machine 430 may transmit, instead of the PL/SQL call, a non-PL/SQL call associated with the non-PL/SQL code. For example, the non-PL/SQL call may be an example of a query message determined during execution of the generated non-PL/SQL code. The virtual machine 430 may transmit the query message to the database 435 (e.g., over a JDBC connection), and may receive a record from the database 435 in response to the query message. The virtual machine 430 may send the record on to the user device 425. In some cases, the database 435 may send the record to the user device 425 in response to the query message, rather than to the virtual machine 430.

Figure 5:
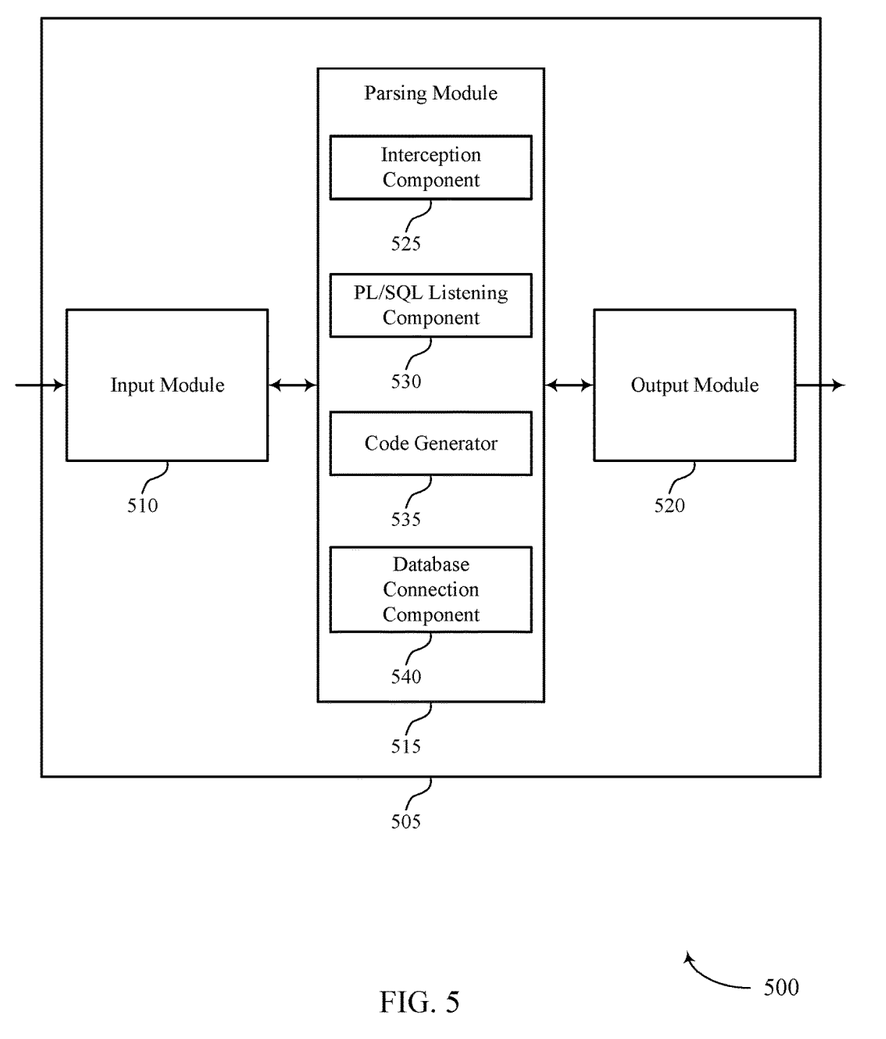
FIGS. 5 and 6 show block diagrams of a device that supports PL/SQL language parsing at a virtual machine in accordance with aspects of the present disclosure.

FIG. 5 shows a block diagram 500 of an apparatus 505 that supports PL/SQL language parsing at a virtual machine in accordance with aspects of the present disclosure. Apparatus 505 may include input module 510, parsing module 515, and output module 520. Apparatus 505 may also include a processor. Each of these components may be in communication with one another (e.g., via one or more buses). In some cases, apparatus 505 may be an example of a user terminal, a database server, or a system containing multiple computing devices.

Parsing module 515 may be an example of aspects of the parsing module 615 or 715 described with reference to FIGS. 6 and 7. Parsing module 515 may also include interception component 525, PL/SQL listening component 530, code generator 535, and database connection component 540.

Parsing module 515 and/or at least some of its various sub-components may be implemented in hardware, software executed by a processor, firmware, or any combination thereof. If implemented in software executed by a processor, the functions of the parsing module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The parsing module 515 and/or at least some of its various sub-components may be physically located at various positions, including being distributed such that portions of functions are implemented at different physical locations by one or more physical devices. In some examples, parsing module 515 and/or at least some of its various sub-components may be a separate and distinct component in accordance with various aspects of the present disclosure. In other examples, parsing module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Interception component 525 may receive, at a virtual machine server, an invocation packet including an indication of a PL/SQL call. PL/SQL listening component 530 may determine one or more procedural functions and one or more query functions corresponding to the PL/SQL call. In some cases, determining the one or more procedural functions and the one or more query functions further includes de-serializing the invocation packet. In some cases, determining the one or more procedural functions and the one or more query functions is based on a JIT compiler, a JIT interpreter, a parser generator, a dependency graph, an annotated parse tree, or a combination thereof.

Code generator 535 may generate non-PL/SQL code configured to perform the one or more procedural functions and the one or more query functions. In some cases, code generator 535 may aggregate non-PL/SQL code snippets, where generating the non-PL/SQL code is based on the aggregated non-PL/SQL code snippets.

Database connection component 540 may transmit, instead of the PL/SQL call, a non-PL/SQL call associated with the non-PL/SQL code to a database. In some cases, the non-PL/SQL call is transmitted to the database over a JDBC connection.

Figure 6:
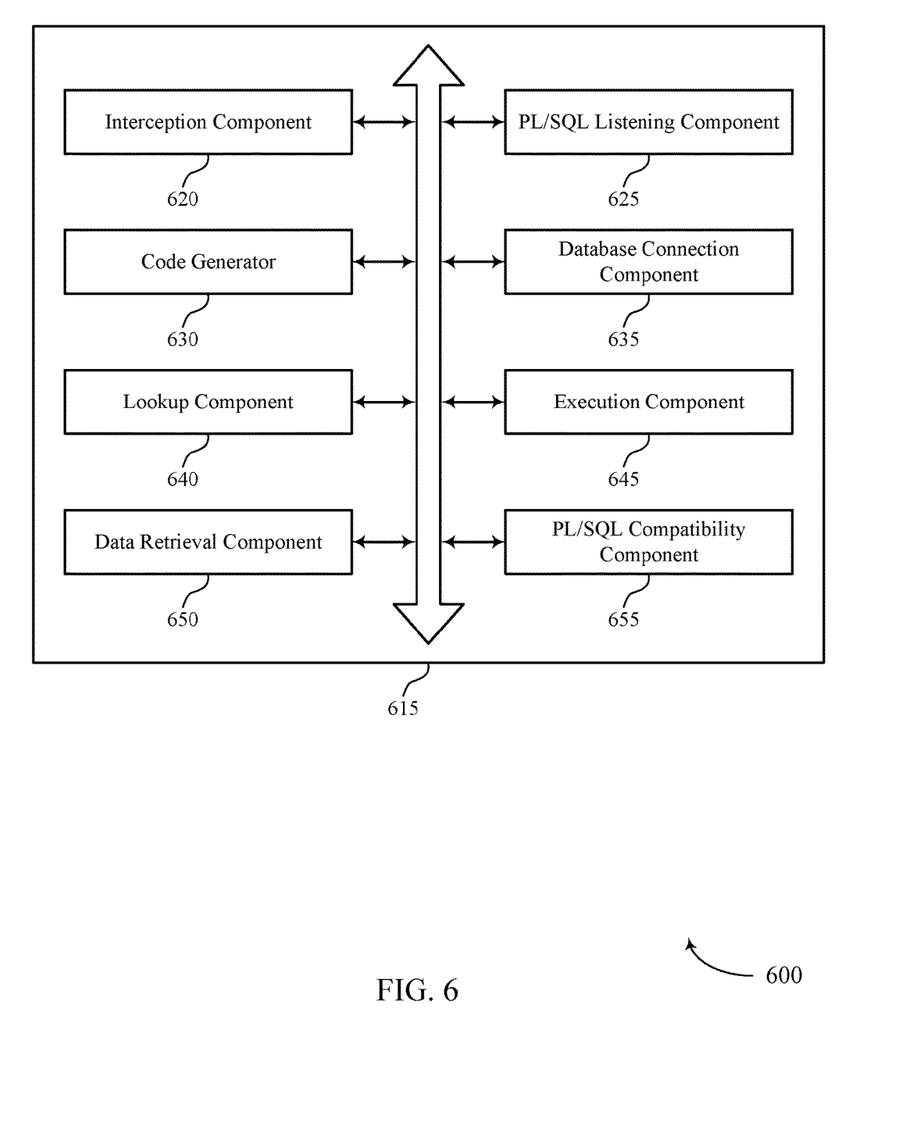

FIG. 6 shows a block diagram 600 of a parsing module 615 that supports PL/SQL language parsing at a virtual machine in accordance with aspects of the present disclosure. The parsing module 615 may be an example of aspects of a parsing module 515 or 715 described with reference to FIGS. 5 and 7. The parsing module 615 may include interception component 620, PL/SQL listening component 625, code generator 630, database connection component 635, lookup component 640, execution component 645, data retrieval component 650, and PL/SQL compatibility component 655. Each of these modules may communicate, directly or indirectly, with one another (e.g., via one or more buses).

Interception component 620 may receive, at a virtual machine server, an invocation packet including an indication of a PL/SQL call. PL/SQL listening component 625 may determine one or more procedural functions and one or more query functions corresponding to the PL/SQL call. In some cases, determining the one or more procedural functions and the one or more query functions further includes de-serializing the invocation packet. Additionally or alternatively, in some cases, determining the one or more procedural functions and the one or more query functions is based on a JIT compiler, a JIT interpreter, a parser generator, a dependency graph, an annotated parse tree, or a combination thereof.

Code generator 630 may generate non-PL/SQL code configured to perform the one or more procedural functions and the one or more query functions. For example, in some cases, code generator 630 may aggregate non-PL/SQL code snippets, where generating the non-PL/SQL code is based on the aggregated non-PL/SQL code snippets.

Database connection component 635 may transmit, instead of the PL/SQL call, a non-PL/SQL call associated with the non-PL/SQL code to a database. In some cases, the non-PL/SQL call is transmitted to the database over a JDBC connection.

Lookup component 640 may identify a non-PL/SQL code snippet corresponding to each of the one or more procedural functions and the one or more query functions.

Execution component 645 may execute the generated non-PL/SQL code at the virtual machine server, where the non-PL/SQL call includes a query message associated with executing the generated non-PL/SQL code. Data retrieval component 650 may receive a record from the database based on the query message. PL/SQL compatibility component 655 may identify that the database is not PL/SQL compatible, where generating the non-PL/SQL code is based on the identification.

Figure 7:
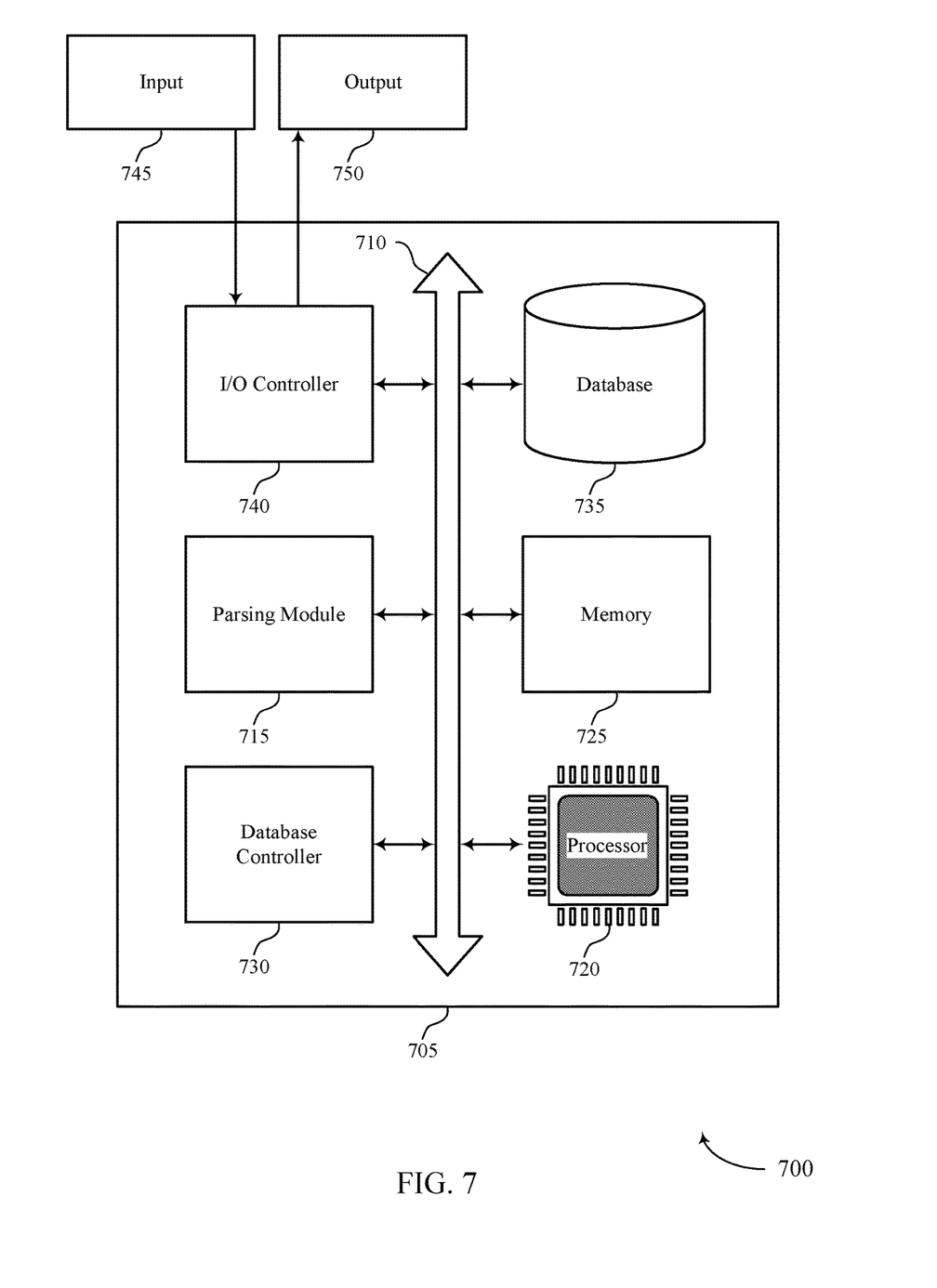
FIG. 7 illustrates a block diagram of a system including a server that supports PL/SQL language parsing at a virtual machine in accordance with aspects of the present disclosure.

FIG. 7 shows a diagram of a system 700 including a device 705 that supports PL/SQL language parsing at a virtual machine in accordance with aspects of the present disclosure. Device 705 may be an example of or include the components of a server. The server may be an example of or a component of a cloud client 105, a cloud platform 115, or a data center 120, as described above, e.g., with reference to FIG. 1. Device 705 may include components for bi-directional data communications including components for transmitting and receiving communications, including parsing module 715, processor 720, memory 725, database controller 730, database 735, and I/O controller 740. These components may be in electronic communication via one or more buses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting PL/SQL language parsing at a virtual machine).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Database controller 730 may manage data storage and processing in database 735. In some cases, a user may interact with database controller 730. In other cases, database controller 730 may operate automatically without user interaction. Database 735 may be an example of a single database, a distributed database, multiple distributed databases, or an emergency backup database.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

Figure 8:
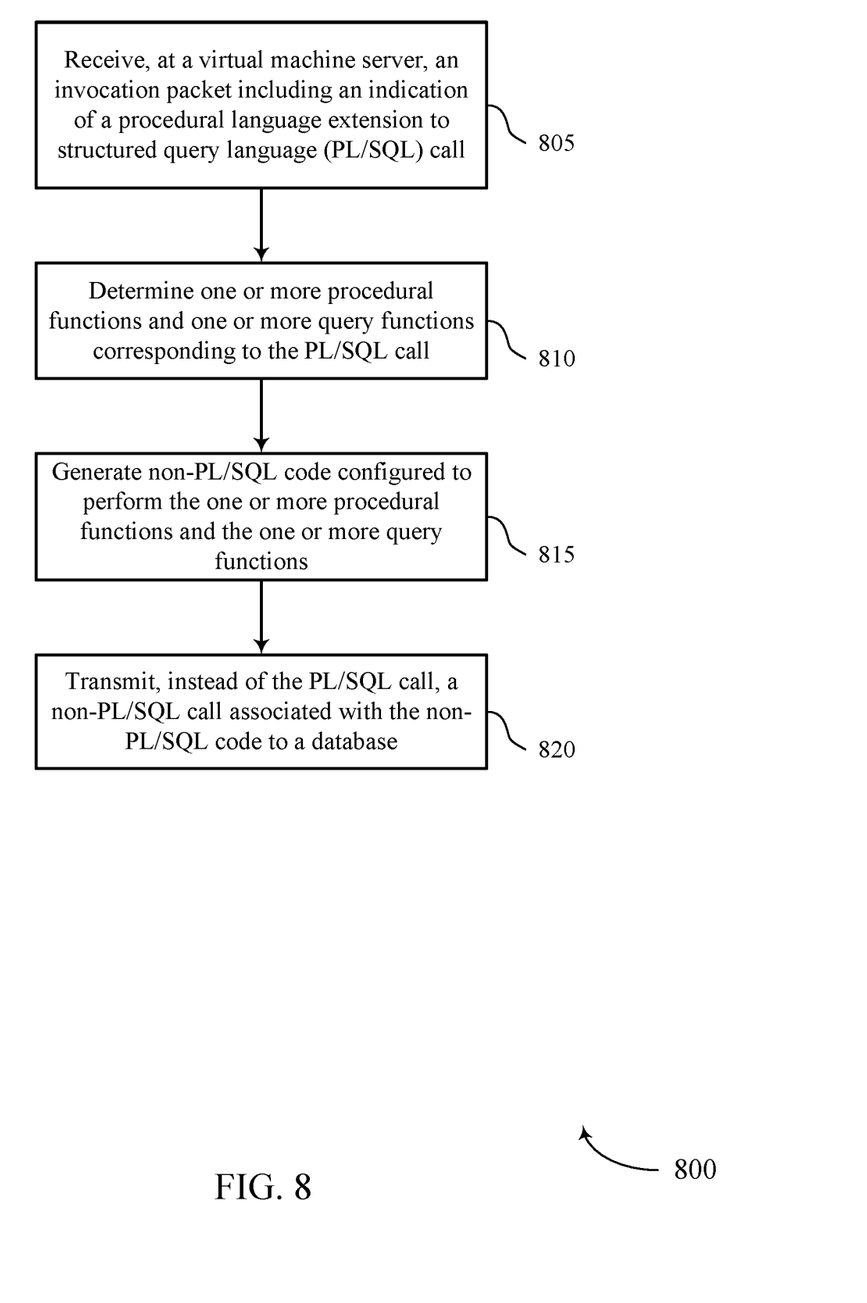
FIGS. 8 and 9 illustrate methods for PL/SQL language parsing at a virtual machine in accordance with aspects of the present disclosure.

FIG. 8 shows a flowchart illustrating a method 800 for PL/SQL language parsing at a virtual machine in accordance with aspects of the present disclosure. The operations of method 800 may be implemented by a server, such as a virtual machine server, or its components as described herein. For example, the operations of method 800 may be performed by a parsing module as described with reference to FIGS. 5 through 7. In some examples, a server, which may be an example of or a component of a cloud client 105, a cloud platform 115, or a data center 120 as described with reference to FIG. 1, may execute a set of codes to control the functional elements of the device to perform the functions described below. Additionally or alternatively, the server may perform aspects of the functions described below using special-purpose hardware.

At block 805 the server may receive an invocation packet comprising an indication of a PL/SQL call. The operations of block 805 may be performed according to the methods described herein. In certain examples, aspects of the operations of block 805 may be performed by an interception component as described with reference to FIGS. 5 and 6.

At block 810 the server may determine one or more procedural functions and one or more query functions corresponding to the PL/SQL call. The operations of block 810 may be performed according to the methods described herein. In certain examples, aspects of the operations of block 810 may be performed by a PL/SQL listening component as described with reference to FIGS. 5 and 6.

At block 815 the server may generate non-PL/SQL code configured to perform the one or more procedural functions and the one or more query functions. The operations of block 815 may be performed according to the methods described herein. In certain examples, aspects of the operations of block 815 may be performed by a code generator as described with reference to FIGS. 5 and 6.

At block 820 the server may transmit, instead of the PL/SQL call, a non-PL/SQL call associated with the non-PL/SQL code to a database. The operations of block 820 may be performed according to the methods described herein. In certain examples, aspects of the operations of block 820 may be performed by a database connection component as described with reference to FIGS. 5 and 6.

Figure 9:
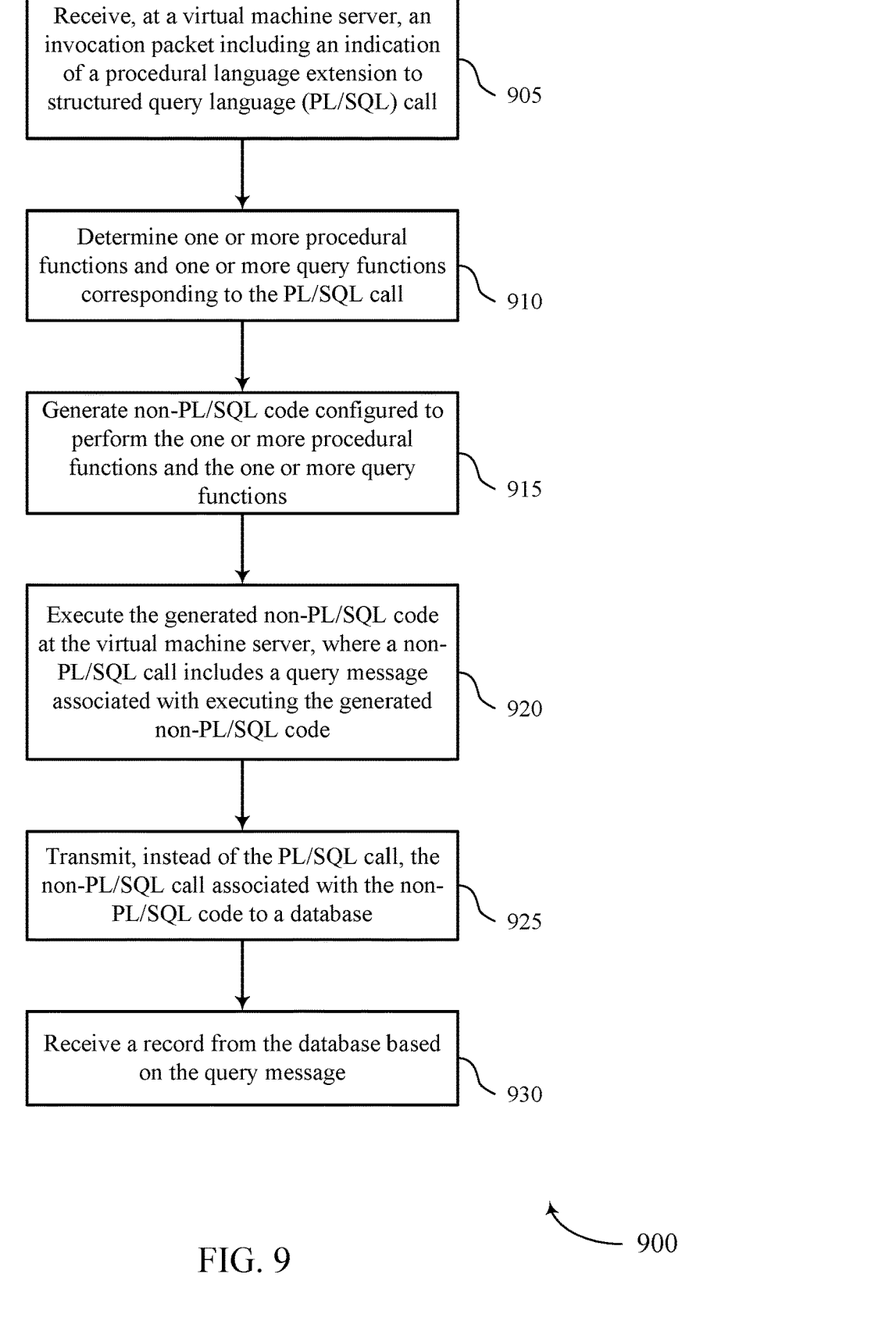

FIG. 9 shows a flowchart illustrating a method 900 for PL/SQL language parsing at a virtual machine in accordance with aspects of the present disclosure. The operations of method 900 may be implemented by a server, such as a virtual machine server, or its components as described herein. For example, the operations of method 900 may be performed by a parsing module as described with reference to FIGS. 5 through 7. In some examples, a server, which may be an example of or a component of a cloud client 105, a cloud platform 115, or a data center 120 as described with reference to FIG. 1, may execute a set of codes to control the functional elements of the device to perform the functions described below. Additionally or alternatively, the server may perform aspects of the functions described below using special-purpose hardware.

At block 905 the server may receive an invocation packet comprising an indication of a PL/SQL call. The operations of block 905 may be performed according to the methods described herein. In certain examples, aspects of the operations of block 905 may be performed by an interception component as described with reference to FIGS. 5 and 6.

At block 910 the server may determine one or more procedural functions and one or more query functions corresponding to the PL/SQL call. The operations of block 910 may be performed according to the methods described herein. In certain examples, aspects of the operations of block 910 may be performed by a PL/SQL listening component as described with reference to FIGS. 5 and 6.

At block 915 the server may generate non-PL/SQL code configured to perform the one or more procedural functions and the one or more query functions. The operations of block 915 may be performed according to the methods described herein. In certain examples, aspects of the operations of block 915 may be performed by a code generator as described with reference to FIGS. 5 and 6.

At block 920 the server may execute the generated non-PL/SQL code at the virtual machine server, wherein a non-PL/SQL call comprises a query message associated with executing the generated non-PL/SQL code. The operations of block 920 may be performed according to the methods described herein. In certain examples, aspects of the operations of block 920 may be performed by an execution component as described with reference to FIGS. 5 and 6.

At block 925 the server may transmit, instead of the PL/SQL call, the non-PL/SQL call comprising the query message associated with the non-PL/SQL code to a database. The operations of block 925 may be performed according to the methods described herein. In certain examples, aspects of the operations of block 925 may be performed by a database connection component as described with reference to FIGS. 5 and 6.

At block 930 the server may receive a record from the database based at least in part on the query message. The operations of block 930 may be performed according to the methods described herein. In certain examples, aspects of the operations of block 930 may be performed by a data retrieval component as described with reference to FIGS. 5 and 6.

A method of programming language parsing is described. The method may include receiving, at a virtual machine server, an invocation packet comprising an indication of a PL/SQL call. The method may further include determining one or more procedural functions and one or more query functions corresponding to the PL/SQL call, generating non-PL/SQL code configured to perform the one or more procedural functions and the one or more query functions, and transmitting, instead of the PL/SQL call, a non-PL/SQL call associated with the non-PL/SQL code to a database.

An apparatus for programming language parsing is described. The apparatus may include a processor, memory in electronic communication with the processor, and instructions stored in the memory. The instructions may be operable to cause the processor to receive, at a virtual machine server, an invocation packet comprising an indication of a PL/SQL call. The instructions may be further operable to cause the processor to determine one or more procedural functions and one or more query functions corresponding to the PL/SQL call, generate non-PL/SQL code configured to perform the one or more procedural functions and the one or more query functions, and transmit, instead of the PL/SQL call, a non-PL/SQL call associated with the non-PL/SQL code to a database.

A non-transitory computer-readable medium for programming language parsing is described. The non-transitory computer-readable medium may include instructions operable to cause a processor to receive, at a virtual machine server, an invocation packet comprising an indication of a PL/SQL call, determine one or more procedural functions and one or more query functions corresponding to the PL/SQL call, generate non-PL/SQL code configured to perform the one or more procedural functions and the one or more query functions, and transmit, instead of the PL/SQL call, a non-PL/SQL call associated with the non-PL/SQL code to a database.

Some examples of the method, apparatus, and non-transitory computer-readable medium described above may further include processes, features, means, or instructions for identifying a non-PL/SQL code snippet corresponding to each of the one or more procedural functions and the one or more query functions. Some examples of the method, apparatus, and non-transitory computer-readable medium described above may further include processes, features, means, or instructions for aggregating the non-PL/SQL code snippets, wherein generating the non-PL/SQL code may be based at least in part on the aggregated non-PL/SQL code snippets.

Some examples of the method, apparatus, and non-transitory computer-readable medium described above may further include processes, features, means, or instructions for executing the generated non-PL/SQL code at the virtual machine server, wherein the non-PL/SQL call comprises a query message associated with executing the generated non-PL/SQL code. Some examples of the method, apparatus, and non-transitory computer-readable medium described above may further include processes, features, means, or instructions for receiving a record from the database based at least in part on the query message.

Some examples of the method, apparatus, and non-transitory computer-readable medium described above may further include processes, features, means, or instructions for identifying that the database may not be PL/SQL compatible, wherein generating the non-PL/SQL code may be based at least in part on the identification.

In some examples of the method, apparatus, and non-transitory computer-readable medium described above, the non-PL/SQL call may be transmitted to the database over a JDBC connection.

In some examples of the method, apparatus, and non-transitory computer-readable medium described above, the determining the one or more procedural functions and the one or more query functions further comprises de-serializing the invocation packet. In some examples of the method, apparatus, and non-transitory computer-readable medium described above, the determining the one or more procedural functions and the one or more query functions may be based at least in part on a JIT compiler, a JIT interpreter, a parser generator, a dependency graph, an annotated parse tree, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for programming language parsing, comprising:
   identifying, at a virtual machine server, that a database is not configured to handle procedural language extension to structured query language (PL/SQL) calls based at least in part on a PL/SQL compatibility component identifying that the database is not compatible with PL/SQL;
   in response to the identifying, intercepting a PL/SQL call at the virtual machine server based at least in part on an extension to a database connector of the database;
   determining one or more procedural functions corresponding to the PL/SQL call and one or more SQL operations specified in the PL/SQL call, the one or more procedural functions corresponding to non-query functionality;
   translating the one or more procedural functions corresponding to the PL/SQL call into non-PL/SQL code configured to perform the one or more procedural functions when executed by a processor; and
   transmitting, instead of the PL/SQL call, the one or more SQL operations specified in the PL/SQL call to the database according to the non-PL/SQL code configured to perform the one or more procedural functions.

2. The method of claim 1, further comprising:
   identifying a non-PL/SQL code snippet corresponding to each of the one or more procedural functions and the one or more SQL operations; and
   aggregating the non-PL/SQL code snippets, wherein generating the non-PL/SQL code is based at least in part on the aggregated non-PL/SQL code snippets.

3. The method of claim 1, further comprising:
   executing the translated non-PL/SQL code at the virtual machine server, wherein execution of the non-PL/SQL code comprises the transmitting the one or more SQL operations to the database; and
   receiving a record from the database based at least in part on the one or more SQL operations.

4. The method of claim 1, wherein the one or more SQL operations are transmitted to the database over a Java database connectivity (JDBC) connection.

5. The method of claim 1, wherein the determining the one or more procedural functions and the one or more SQL operations further comprises de-serializing an invocation packet comprising an indication of the PL/SQL call.

6. The method of claim 1, wherein the determining the one or more procedural functions and the one or more SQL operations is based at least in part on a just-in-time (JIT) compiler, a JIT interpreter, a parser generator, a dependency graph, an annotated parse tree, or a combination thereof.

7. An apparatus for programming language parsing, comprising:
   a processor;
   memory in electronic communication with the processor; and
   instructions stored in the memory and operable, when executed by the processor, to cause the apparatus to:
   identify, at a virtual machine server, that a database is not configured to handle procedural language extension to structured query language (PL/SQL) calls based at least in part on a PL/SQL compatibility component identifying that the database is not compatible with PL/SQL;
   in response to the identifying, intercept a PL/SQL call at the virtual machine server based at least in part on an extension to a database connector of the database;
   determine one or more procedural functions corresponding to the PL/SQL call and one or more SQL operations specified in the PL/SQL call, the one or more procedural functions corresponding to non-query functionality;

translate the one or more procedural functions corresponding to the PL/SQL call into non-PL/SQL code configured to perform the one or more procedural functions when executed by a processor; and transmit, instead of the PL/SQL call, the one or more SQL operations specified in the PL/SQL call to the database according to the non-PL/SQL code configured to perform the one or more procedural functions.

8. The apparatus of claim 7, wherein the instructions are further executable by the processor to:

identify a non-PL/SQL code snippet corresponding to each of the one or more procedural functions and the SQL operations; and aggregate the non-PL/SQL code snippets, wherein generating the non-PL/SQL code is based at least in part on the aggregated non-PL/SQL code snippets.

9. The apparatus of claim 7, wherein the instructions are further executable by the processor to:

execute the translated non-PL/SQL code at the virtual machine server, wherein execution of the non-PL/SQL code comprises the transmitting the one or more SQL operations to the database; and receive a record from the database based at least in part on the one or more SQL operations.

10. The apparatus of claim 7, wherein the one or more SQL operations are transmitted to the database over a Java database connectivity (JDBC) connection.

11. The apparatus of claim 7, wherein the determining the one or more procedural functions and the one or more SQL operations further comprises de-serializing an invocation packet comprising an indication of the PL/SQL call.

12. The apparatus of claim 7, wherein the determining the one or more procedural functions and the one or more SQL operations is based at least in part on a just-in-time (JIT) compiler, a JIT interpreter, a parser generator, a dependency graph, an annotated parse tree, or a combination thereof.

13. A non-transitory computer-readable medium storing code for programming language parsing, the code comprising instructions executable by a processor to:

identify, at a virtual machine server, that a database is not configured to handle procedural language extension to structured query language (PL/SQL) calls based at least in part on a PL/SQL compatibility component identifying that the database is not compatible with PL/SQL;

in response to the identifying, intercept a PL/SQL call at the virtual machine server based at least in part on an extension to a database connector of the database;

determine one or more procedural functions corresponding to the PL/SQL call and one or more SQL operations specified in the PL/SQL call, the one or more procedural functions corresponding to non-query functionality;

translate the one or more procedural functions corresponding to the PL/SQL call into non-PL/SQL code configured to perform the one or more procedural functions when executed by a processor; and transmit, instead of the PL/SQL call, the one or more SQL operations specified in the PL/SQL call to the database according to the non-PL/SQL code configured to perform the one or more procedural functions.

14. The non-transitory computer-readable medium of claim 13, wherein the instructions are further executable by the processor to:

identify a non-PL/SQL code snippet corresponding to each of the one or more procedural functions and the SQL operations; and aggregate the non-PL/SQL code snippets, wherein generating the non-PL/SQL code is based at least in part on the aggregated non-PL/SQL code snippets.

15. The non-transitory computer-readable medium of claim 13, wherein the instructions are further executable by the processor to:

execute the translated non-PL/SQL code at the virtual machine server, wherein execution of the non-PL/SQL code comprises the transmitting the one or more SQL operations to the database; and receive a record from the database based at least in part on the one or more SQL operations.

16. The non-transitory computer-readable medium of claim 13, wherein the one or more SQL operations are transmitted to the database over a Java database connectivity (JDBC) connection.

17. The non-transitory computer-readable medium of claim 13, wherein the determining the one or more procedural functions and the one or more SQL operations further comprises de-serializing an invocation packet comprising an indication of the PL/SQL call.

18. The method of claim 1, further comprising:

executing a set of tests on the non-PL/SQL code; and determining whether the non-PL/SQL code performs the one or more procedural functions specified in the PL/SQL call based at least in part on executing the set of tests, wherein transmitting the one or more SQL operations to the database is based at least in part on the determining whether the non-PL/SQL code performs the one or more procedural functions.

19. The apparatus of claim 7, wherein the instructions are further executable by the processor to:

execute a set of tests on the non-PL/SQL code; and determine whether the non-PL/SQL code performs the one or more procedural functions specified in the PL/SQL call based at least in part on executing the set of tests, wherein transmitting the one or more SQL operations to the database is based at least in part on the determining whether the non-PL/SQL code performs the one or more procedural functions.

20. The non-transitory computer-readable medium of claim 13, wherein the instructions are further executable by the processor to:

execute a set of tests on the non-PL/SQL code; and determine whether the non-PL/SQL code performs the one or more procedural functions specified in the PL/SQL call based at least in part on executing the set of tests, wherein transmitting the one or more SQL operations to the database is based at least in part on the determining whether the non-PL/SQL code performs the one or more procedural functions.

* * * * *